METHOD FOR PRODUCING ELECTRICAL CONTACT ELEMENTS

Filed Nov. 18, 1968

INVENTOR.
AKIRA SHIBATA
BY
Hopgood & Calimafde
ATTORNEYS

United States Patent Office 3,606,680

Patented Sept. 21, 1971

3,606,680

METHOD FOR PRODUCING ELECTRICAL CONTACT ELEMENTS

Akira Shibata, Tokyo, Japan, assignor to Chugai Electric Industrial Co., Ltd., Tokyo, Japan Filed Nov. 18, 1968, Ser. No. 776,336
Claims priority, application Japan, June 21, 1968, 43/42,967
Int. Cl. H01r 9/16
U.S. Cl. 29—630C 8 Claims

ABSTRACT OF THE DISCLOSURE

A contact metal having good cold-pressure bonding properties is bonded to a metal substrate which normally has a low propensity for cold-pressure bonding. The contact metal, e.g. silver, is placed on the metal substrate, such as stainless steel, and the contact metal immediately cold deformed by contact with a punch until a balance is achieved between the applied pressure and the deformation resistance of the contact metal, whereby the contact metal is brought into intimate crystallographic contact with the substrate. Immediately thereafter, while the contact metal is still under pressure, the contact metal is heated to above its recrystallization temperature and below its melting point to complete the deformation of said metal and effect metallurgical bonding to the substrate.

This invention relates to a method for producing electrical contact elements by pressure-bonding and, in particular, to a novel method for producing such elements in which the contact metal has good cold-pressure bonding properties, but in which the metal substrate has a low propensity for cold-pressure bonding.

The contact metals to which this invention is directed include the ductile precious metals silver, platinum, gold and palladium and alloys based on these metals; while the metal substrate includes iron, spring steel, stainless steel, nickel silver, copper and the alloys copper-zinc, beryllium-copper, copper-phosphorus, and the like.

It is known that electrical contacts can be easily produced by pressure bonding where both the contact metal and the metal substrate are mutually responsive to cold-pressure bonding, and where preferably the contact metal is prepared with a clean surface and is impact deformed or compressed onto the surface of the substrate. However, where metal substrates such as spring steel, stainless steel, etc. which exhibit poor cold-pressure bonding response to such contact metals, are employed, it is difficult to obtain an adequate bond that will be able to withstand for long periods the rigorous make-and-break cycles to which the contact element is subjected in use. The term "contact element" employed herein has reference to an article of manufacture in which a piece or portion of a contact metal is bonded to a metal substrate which may be a flexible metal strip or other supporting metal shape.

Generally, where the metal substrate has a low propensity for cold pressure bonding, the contact metal usually has to be soldered, brazed, spot welded or otherwise inlaid on or to the surface of the metal substrate. However, when the foregoing methods are used, certain disadvantages arise, such as low electrical conductivity due to diffusion of one metal into the other, decrease in heat conductivity across the interfacial joint, and, where the soldering or brazing temperature is too high, the substrate may be adversely affected, that is to say, the substrate may lose its temper and hence its spring quality. Moreover, where diffusion at the joint is too excessive, intermetallic compounds may form which can render the joint brittle and, therefore, subject to failure during use.

It is thus the object of this invention to produce a contact element in which a strong joint or bonded interface is provided on a substrate which normally has poor response to cold pressure bonding.

Another object is to provide a method for producing an electrical contact element in which the contact metal is metallurgically bonded to a metal substrate while avoiding substantial metal diffusion at the interface of the bond.

A still further object of the invention is to provide a method for producing a contact element using a contact metal having good cold pressure bonding properties and a metal substrate in which the cold pressure bonding propensity is low, wherein the contact metal is brought into intimate and crystallographic contact with the substrate by impact compression, immediately following which the deformed contact metal is heated above its recrystallization temperature and below its melting point while the pressure is maintained, whereby to assure a strong clean interfacial bond.

These and other objects will more clearly appear when taken in conjunction with the following disclosure and the accompanying drawings, wherein.

Figure 1:
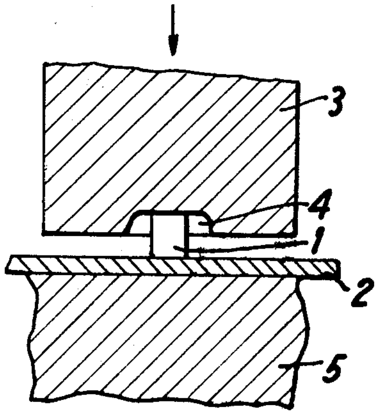
FIGS. 1 to 3 are illustrative of the steps employed in carrying out a preferred embodiment of the invention.

In its broad aspects, the method comprises placing the contact metal to be bonded on the metal substrate, applying impact pressure to the contact metal to cold deform it and reduce the thickness thereof at least about 20% until a balance is achieved between the applied pressure and the deformation resistance of said contact metal as a result of said cold deformation to effect intimate crystallographic contact with said substrate, and thereafter immediately heating the deformed contact metal while under said pressure to above its recrystallization temperature but below its melting point to complete the deformation of said metal through further metal flow and effect metallurgical bonding to said substrate with minimum perceptible diffusion at the bonding interface. By employing a die punch or header with a cavity of predetermined volume within which the contact metal is confined during deformation, the final dimensions and shape of the bonded contact can be assured.

The advantages of cold deforming the contact metal first is that clean metal contact during initial compression is assured with the substrate. Moreover, before heat is selectively applied to the compressed contact metal, an intimate crystallographic contact is assured between the two metals at the interface. Apparently, because of the vigorous metal flow which occurs under high pressure along the interface, it appears that the substrate metal at the interface is subjected to microscopic rupturing at the surface such that the contact metal is intimately and crystallographically brought in contact with the freshly ruptured substrate, the distance between the two metals at the interface being of the order of a few angstroms, for example, as close as 4 angstroms. While such closeness of metal surfaces will usually result in some cold bonding, this by itself is not sufficient where the metal substrate itself has a low propensity to cold bond. However, since there is a highly cold worked region at the interface due to the vigorous flow of contact metal along the interface, the immediate application of heat to the contact metal to raise it to a temperature above its recrystallization temperature while still under pressure results in immediate recrystallization of the cold worked region at the interface which leads to a strong crystallographic bond.

Where the contact metal is silver and where it has been cold deformed, for example, at least about 50% or higher in thickness before being heated, its recrystallization temperature is usually very low and may be as low as a few hundred degrees centigrade. It must be remembered, however, that the vigorous metal flow of contact metal which occurs along and at the interface may be of a higher order of deformation than the metal above it so that it may recrystallize at a more rapid rate and provide practically instant bonding with the metal substrate at the interface during the initial stages of heating under pressure.

The heating takes place in the order of a few hundred milliseconds by passing a high surge of heating current across the interface. Very strong bonds have been obtained with such short time heating.

Figure 2:
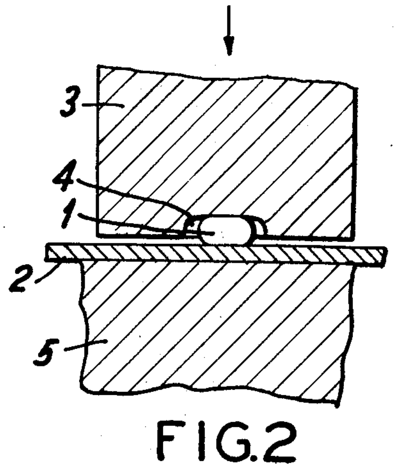
Figure 3:
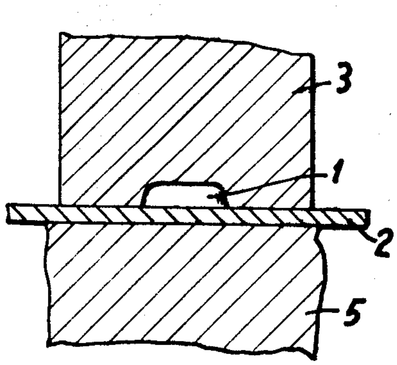

Referring now to the preferred embodiment illustrated in FIGS. 1 to 3, a contact metal 1 having a high propensity for cold bonding, for example, silver, platinum, gold, palladium, alloys thereof, or the like, is shown supported on a metal substrate 2, such as iron, nickel silver, stainless steel, etc., of relatively poor cold bondability under pressure, which substrate is suported on a die 5 located directly below a vertically movable header or punch 3 having a metal-forming cavity 4 located substantially centrally at the end face thereof. The contact metal has at least the same volume as that of the punch cavity, except that its height is greater than the depth of the cavity so that the contact metal can be reduced in height at least greater than 20%, generally at least about 30% and, more preferably, at least about 50%. The contact metal is deformed by bringing down the punch as shown in FIG. 2 in the direction of the arrow. Depending upon the amount of pressure and speed of punch 3 against die 5, the contact metal can be vigorously cold worked or deformed to lower its recrystallization temperature substantially. Thus, as stated hereinbefore in the case of highly deformed silver, the recrystallization temperature may be below a few hundred ° C., e.g. range from 200° C. to 300° C. or even below.

Figure 4:
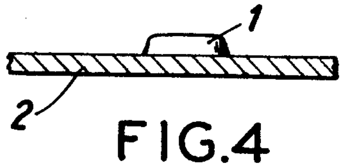
FIG. 4 depicts an electrical contact element produced in accordance with the preferred embodiment of the invention.

The pressure is first applied by the punch until a relative balance is obtained between the applied pressure and the deformation resistance of the contact metal. As shown in FIG. 2, the punch approaches die 5 just short of touching it, following which a high current is immediately applied across the dies, causing contact metal 1 to heat to above its recrystallization temperature and flow still further and fill up the cavity completely as shown in FIG. 3 to form the contact element shown in FIG. 4. During cold compression, the contact metal flows along the interface between it and substrate 2 to provide intimate crystallographic contact with the substrate, that is to say, contact in which molecular forces come into play, following which the deformed contact metal is immediately heated and the remainder deformation completed (FIG. 3) and bonding effected at the interface with minimum diffusion of the metal into the other across the interface. By first applying the pressure on the cold contact metal, the inflow of the ambient atmosphere is prevented and, thus, oxidation is avoided along the interface during the heating step as punch 3 meets the surface of metal substrate 2. As stated hereinabove, the voltage necessary to supply the current is substantially instantaneously applied before punch 3 meets die 5. The current flow between punch 3 and die 5 causes the punch to heat up and conduct heat to the contact metal. Since the partially deformed contact immediately softens upon heating, it flows quickly to fill up the punch cavity and bond cleanly to the substrate.

The amount of heat necessary to easily determined by trial and error so long as the temperature exceeds the recrystallization temperature of the deformed contact metal and is below its melting point. If the temperature does not exceed the recrystallization point of the metal, then the contact metal will not flow appreciably at the interface and an adequate bond will not be obtained. On the other hand, if the contact metal is melted to any degree, substantial diffusion is apt to occur across the interface leading to the disadvantages which are encountered in spot welding, soldering or brazing. Assuming the piece of contact metal is about 2 mm. high, it might first be deformed to a height of 1 mm. (50% reduction in height) and immediately heated to above its recrystallization temperature while under pressure and the height reduced to 0.9 mm. to cause the metal to fill up the cavity and bond itself to the substrate during completion of recrystallization. The substrate may be a continuous strip of metal along which the contact metal may be bonded at spaced intervals.

Figure 5:
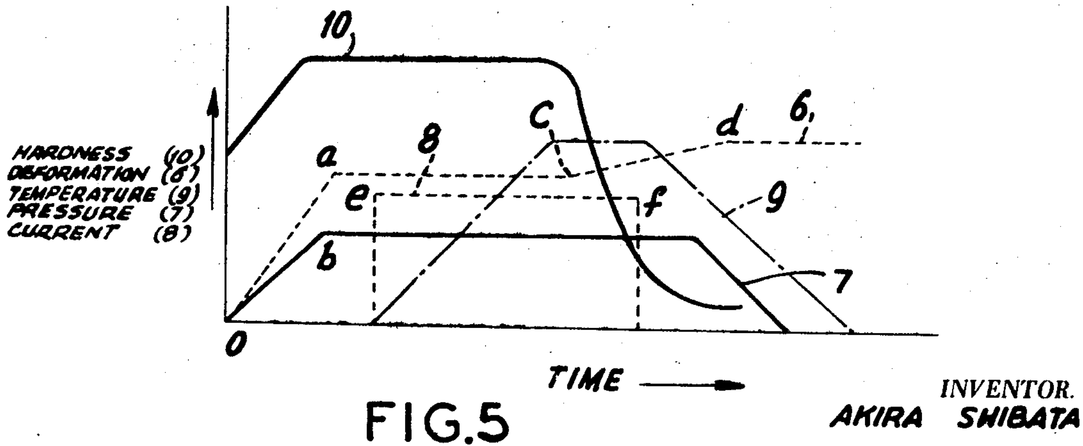
FIG. 5 shows how the factors pressure, temperature, hardness, deformation, and heating current enter in the carrying out of the method of the invention.

The factors which enter into the method of the invention are illustrated in FIG. 5 which relates the hardness 10, deformation 6, temperature 9, pressure 7 and current 8 as a function of time. As the pressure is applied as shown in FIGS. 1 and 2, the pressure rises to the level *b* and is maintained at that level as shown for upwards of one second, more or less. In the meantime, the hardness 10 rises to the level shown as the metal is deformed to the level *a*, e.g. 50% shown in curve 6 and continued at that level to *c*. Immediately after the metal has been cold deformed to the level *a*, heating current is applied to a level *e*–*f* for several hundred milliseconds. The temperature of the punch and contact metal still under pressure rises as shown in curve 9 and reaches an optimum level above the recrystallization temperature of the deformed contact metal. As the contact metal heats up above the recrystallization temperature while under pressure, it deforms still further and fills up the punch cavity as shown by the deformation increase from *c* to *d* on curve 6 due to the softening of the metal (note the hardness drop of curve 10). At *f* of curve 8, the current is shut off and the temperature drops as shown in curve 9, the pressure thereafter being relieved as shown by curve 7. As stated above, the cycle may be carried out over a total time of about one second or so, the heating being carried out within the total cycle over a time period of about several hundred, e.g. 200, milliseconds.

The punch or header is made of a hard heat resistant alloy adapted to heat up rapidly with applied current. Materials which may be employed as a punch are high-speed steel (for example, 18% W, 4% Cr, 1% V and 0.8% C and the balance iron), or cemented tungsten carbide, such as one containing 85% by weight tungsten carbide and the balance cobalt. Such materials have a higher electrical resistance than the contact metal, the substrate, and the interface thereof, so that in the main the heat is selectively generated in the punch or head. Since the punch completely encompasses the contact metal, the contact metal immediately heats up to above its recrystallization temperature. The substrate does not heat up to any extent since it and the die are maintained relatively cold, and especially since the substrate is usually a long continuous strip. As will be appreciated by those skilled in the art, the die 5 may be internally water cooled in the usual manner to avoid heat build-up during continuous operation of the method.

Referring again to FIG. 5, it will be noted that as the contact metal is cold deformed, it rises to a hardness plateau (curve 10) at which a balance is achieved between hardness and applied pressure. This corresponds to the position shown in FIG. 2 where a balance is achieved between the applied pressure and the deformation resistance of the contact metal. Following the application of heat by passing a high surge of current through punch 3, the metal immediately softens, thereby lowering the resistance of the contact metal to deformation, whereby the metal further deforms as shown by the position in FIG. 3 and the change of *c* to *d* in curve 6 of FIG. 5.

As has been stated hereinbefore, in order to assure that the two metals will bond, the contact distance between the contact metal and the substrate should be reduced to several angstroms, for example, about 4 angstroms, since at such distances molecular interaction will occur and provide the necessary conditions for bonding. In soldering techniques, this is achieved by melting a flux material at the interface by relying on the wettability resulting from the melted flux. However, a longer time cycle is employed in soldering than in the present method in view of the time required to melt the flux. Consequently, the substrate is generally heated up and undergoes annealing, which should be avoided, especially in situations where the substrate should have a springy quality for make-and-break electrical contact elements. In addition, the strength of the substrate is apt to be lowered because of overheating during soldering.

In cold-pressure bonding, where both the contact metal and the substrate have good cold-pressure bonding properties, the deformation of both metals under pressure is generally large. Because of this, it is difficult to make precise sizes and, generally, the bonded composite must be cut or machined to selected sizes.

In heat-pressure bonding techniques, both the contact metal and the substrate are heated before pressure is applied. The disadvantage of this method is that the contact surfaces of the metal tend to oxidize and result in high resistance at the interface. Even when the metals are heated in a non-oxidizing atmosphere, they may absorb gases at the high temperature and adversely affect the bonding at the surface. As will be appreciated from the foregoing, the method of bonding of this invention is different and provides new and improved results. In carrying out the method of the invention, the heating may be achieved by electrical resistance heating or by high frequency induction heating.

As conducive to a better understanding of the invention, the following examples are given:

EXAMPLE 1

A piece of silver contact metal having a diameter of about 3 mm. and length of about 1.3 mm. is placed on a substrate of nickel silver of thickness about 0.3 mm. and a width of 7 mm. supported on a die. A header or punch of tool steel having a metal-forming cavity of 12.5 mm.$^2$ in area and 1 mm. deep is applied to the silver contact metal at a load of 2 tons and the metal deformed until the metal resists further deformation, following which 2000 amps are immediately applied across the punch and die for about 200 milliseconds under said load, the temperature of the contact being raised to 200° C. during which the contact metal is further deformed to form a contact element comprising the silver metal 4 mm. in diameter and 1 mm. thick securely and strongly bonded to the nickel silver substrate.

A contact metal which normally presents bonding problems is silver containing a dispersion of about 10% by weight of cadmium oxide. However, this contact metal can be bonded by the method of the invention on a substrate of stainless steel of, for example, the 18/8 type. An example illustrating the foregoing is given as follows:

EXAMPLE 2

A silver-cadmium oxide electrical contact alloy containing a dispersion of about 10% by weight of CdO of 3 mm. in diameter and 3 mm. thick is placed on a stainless steel substrate (about 18% chromium, about 8% nickel and the balance iron) of 0.8 mm. thick, 10 mm. wide and 50 mm. long supported on a tool steel die. A header or punch of cemented tungsten carbide surrounded by a high frequency coil and having a metal-forming cavity of about 6 mm. in diameter and 1 mm. deep is brought down upon the contact metal with a load of 3 tons, whereby to deform the contact metal and cause it to flow along the interface between the contact metal and the metal substrate. The high frequency coil preheats the punch to a temperature in the neighborhood of about 600° C. After the contact has been instantaneously deformed within the cavity, the heat from the punch thereafter heats the deformed metal to above its recrystallization temperature to soften the alloy and cause it to bond cleanly to the metal substrate, the final dimension of the contact being 6 mm. in diameter and 1 mm. thick. Due to thermal lag, the contact metal will first be cold deformed, following which it will heat up and recrystallize.

As stated herein, the method of the invention is applicable to contact metals selected from the group consisting of silver, platinum, gold, palladium and alloys based on these metals. Examples of such alloys are: 10% Cd and the balance Ag; 90% Ag–10% CdO; 90% Ag–10% Ni; 70% Ag–30% Pd; 74.5% Ag–25% Au–0.5% Ni; 95% Ag–5% Ni; 90% Ag–10% Cu; 72% Ag–26% Cu–2% Ni; 97% Ag–3% Pd; 97% Ag–3% Pt; 95% Pt–5% Ir; 85% Pt–15% Ir; 90% Pt–10% Ru; 96% Pt–4% W; 90% Pd–10% Ru; 70% Pd–30% Ag; 72% Pd–26% Ag–2% Ni; 45% Pd–30% Ag–20% Au–5% Pt; 90% Au–10% Cu; 75% Au–25% Ag; 69% Au–25% Ag–6% Pt; 41.7% Au–32.5% Cu–18.8% Ni–7% Zn; and the like electrical contact alloys. The foregoing compositions are merely illustrative of electrical contact metals based substantially on the precious metals Ag, Pt, Au and Pd.

As stated with respect to the substrate metals, these may include iron, spring steel, stainless steel, nickel silver, copper and alloys of copper-zinc, beryllium-copper and copper-phosphorus. With respect to spring steel, the composition may comprise SAE 1050, SAE 1065, etc. The stainless steels that may be employed may comprise 16 to 20% chromium, 4 to 10% nickel and the balance essentially iron. A stainless steel particularly useful as a substrate is one containing about 18% chromium, about 8% nickel and the balance iron.

Nickel silver, otherwise known as German silver, may comprise 45 to 65% copper, 15 to 40% zinc and 8 to 35% nickel. A typical example of nickel silver is one containing 55% copper, 25% zinc and 20% nickel. The following alloys are available in sheet or strip form: 54% copper, 16% zinc and 30% nickel; 58% copper, 24% zinc and 18% nickel; and 60% copper, 30% zinc and 10% nickel.

Typical copper-zinc alloys include those falling in the range of 5 to 40% zinc and the balance copper. The beryllium-copper alloys include those containing about 1% to 3% of beryllium and the balance substantially copper; while the copper phosphorus alloys may contain about 0.02% phosphorus and the balance substantially copper.

The recrystallization temperature of the contact metal will depend upon the amount of cold work applied to it by cold deformation. Where the metal is somewhat severely cold worked, for example, at least 50% or higher, the recrystallization temperature for silver may be as low as 100° C., that for gold as low as 200° C. and, for the very high melting point platinum, as low as 450° C.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method of producing a make-and-break electrical contact element which comprises the sequential steps of contacting a substrate of a metal strip selected from the group consisting of iron, spring steel, nickel silver, copper and the alloys copper-zinc, beryllium-copper and copper-phosphorus in superposed relationship with a contact metal comprising a ductile precious metal selected from the group consisting of silver, platinum, gold, palladium, and alloys based on these metals, applying impact pressure to the contact metal to partially cold deform it and reduce the thickness thereof at least about 20% and cause the contact metal to cold flow along the interface between it and the substrate until a balance is achieved between the applied pressure and the deformation resistance of said contact metal as a result of said partial cold deformation whereby to effect intimate crystallographic contact with said substrate at said interface while substantially preventing inflow of ambient atmosphere along the interface, and thereafter immediately heating the partially deformed contact metal while under said applied pressure to above its recrystallization temperature but below its melting point to complete the deformation of said contact metal through further metal flow along the interface and effect metallurgical bonding to said substrate with minimum perceptible diffusion at the bonding interface while substantially avoiding oxidation along said interface.

2. A method of producing a make-and-break electrical contact element which comprises the sequential steps of supporting a metal substrate in the form of a metal strip selected from the group consisting of iron, spring steel, stainless steel, nickel silver, copper and the alloys copper-zinc, beryllium-copper and copper-phosphorus on a die located below a punch having a metal-forming cavity of predetermined volume, placing a piece of ductile contact metal selected from the group consisting of silver, platinum, gold and palladium and alloys based on these metals on said substrate in interfacial relationship therewith, the volume of said contact metal being at least equal to that of the metal-forming cavity and having a height greater than the depth of the metal-forming cavity, applying pressure to said contact metal by impact of said punch on said metal to confine it within said cavity and partially cold deform it at least 20% of its thickness and cause said contact metal to cold flow along the interface between it and the metal substrate whereby to effect intimate crystallographic contact with said substrate at said interface until a balance is achieved between the applied pressure and the deformation resistance of the contact metal while substantially preventing inflow of ambient atmosphere along the interface, thereafter immediately heating the partially deformed contact metal while under said pressure to a temperature above the recrystallization temperature but below the melting point, whereby to complete the deformation of said metal and effect metallurgical bonding to said substrate with minimum diffusion at the interface while substantially avoiding oxidation along said interface, interrupting said heating, and then removing the applied pressure.

3. The method of claim 2, wherein the contact metal is cold deformed to reduce its thickness at least about 30%.

4. The method of claim 2, wherein the contact metal is cold deformed to reduce its thickness at least about 50%.

5. The method of claim 2, wherein the substrate metal is a continuous strip of metal along which the contact metal is bonded at spaced intervals.

6. The method of claim 2, wherein the ductile contact metal is silver, and wherein the metal substrate is nickel silver.

7. The method of claim 2, wherein the ductile contact metal is an alloy of silver and cadmium oxide and the metal substrate is stainless steel.

8. The method of claim 2, wherein the steps of applying pressure and heat are carried out at a time cycle of up to about a second, and wherein the heating time within said cycle is carried out within the range of about several hundred milliseconds.

References Cited

UNITED STATES PATENTS

| | | | |
|---|---|---|---|
| 2,754,393 | 7/1956 | Clair, Jr. | 29—630CX |
| 3,151,385 | 10/1964 | Gwyn, Jr. | 29—630C |
| 3,341,943 | 9/1967 | Gwyn, Jr. | 29—630C |
| 3,371,414 | 3/1968 | Gwyn, Jr. | 29—630C |

GRANVILLE Y. CUSTER, Jr., Primary Examiner